(12) United States Patent
Orita et al.

(10) Patent No.: US 7,601,317 B2
(45) Date of Patent: Oct. 13, 2009

(54) PROCESS FOR DISPOSING WASTE GAS COMPRISING SULFUR OXIDES AND APPARATUS THEREOF

(75) Inventors: Keigo Orita, Tokyo (JP); Sachio Maekawa, Tokyo (JP); Shinichi Kawabata, Tokyo (JP)

(73) Assignee: Hitachi Plant Technologies, Ltd., Tokyo (JP)

( * ) Notice: Subject to any disclaimer, the term of this patent is extended or adjusted under 35 U.S.C. 154(b) by 130 days.

(21) Appl. No.: 11/905,460

(22) Filed: Oct. 1, 2007

(65) Prior Publication Data

US 2008/0199378 A1 Aug. 21, 2008

(30) Foreign Application Priority Data

Feb. 16, 2007 (JP) ............................. 2007-036468

(51) Int. Cl.
*B01D 53/50* (2006.01)
*B01D 53/74* (2006.01)

(52) U.S. Cl. .............................. 423/243.01; 423/215.5; 423/DIG. 6; 422/105; 422/108; 422/111; 422/168

(58) Field of Classification Search ............. 423/215.5, 423/243.01, DIG. 6; 422/105, 108, 111, 422/168
See application file for complete search history.

(56) References Cited

U.S. PATENT DOCUMENTS

| 4,543,110 A | * | 9/1985 | Engelhardt et al. ............ 95/227 |
| 6,773,555 B1 | * | 8/2004 | Izutsu et al. ............... 204/157.3 |
| 2003/0190270 A1 | * | 10/2003 | Yasutake et al. ............. 422/177 |

FOREIGN PATENT DOCUMENTS

| JP | A 10-230128 | 9/1998 |
| JP | A 2002-045643 | 2/2002 |

* cited by examiner

*Primary Examiner*—Timothy C Vanoy
(74) *Attorney, Agent, or Firm*—Oliff & Berridge, PLC

(57) ABSTRACT

A method for enlarging the particle diameters of sulfuric acid mists in waste gas and collecting the sulfuric acid mists in high efficiency is provided. A process for disposing waste gas containing sulfur oxides that introduces the waste gas in dry type electrostatic precipitator to remove dusts and then introduces the waste gas in a wet desulfurization apparatus to carry out desulfurization, wherein outside air with a flow rate at which the waste gas introduced in the wet desulfurization apparatus is the dew point of acid is taken in from an introducing tube to mix the outside air in the waste gas.

6 Claims, 5 Drawing Sheets

PROCESS FOR DISPOSING WASTE GAS COMPRISING SULFUR OXIDES AND APPARATUS THEREOF

BACKGROUND (a) Field of the Invention

The present invention relates to a process for disposing waste gas containing sulfur oxides discharged from a coal thermal power station and specifically relates to a process for disposing waste gas that collects sulfuric acid mist contained in the waste gas.

(b) Description of the Related Art

Harmful substances such as sulfur compounds prepared from sulfur contained in fuel and nitrogen oxides obtained by oxidizing nitrogen in a combustion chamber at high temperature and high pressure state are contained in waste gas discharged from a boiler of a coal thermal power station, in addition to carbon dioxide being a main component. Consequently, the waste gas is discharged in atmosphere through the collection treatment of denitrogenation and desulfurization in series so that the waste gas discharged does not affect peripheral environment. In a general waste gas disposal apparatus, a denitration apparatus, dry type electrostatic precipitator, a wet desulfurization apparatus and wet type electrostatic precipitator are arranged in order from a boiler side and connected in series through piping.

The denitration apparatus is an apparatus decomposing nitrogen oxides (NOx) in the waste gas to harmless nitrogen ($N_2$) and water vapor ($H_2O$) by the action of a catalyst using ammonia ($NH_3$).

The dry type electrostatic precipitator is an apparatus providing electric charge to particles such as dusts floating in air by corona discharge emitted from a discharge electrode and collecting the particles to a dust-collecting electrode by Coulomb force.

The wet desulfurization apparatus is an apparatus for carrying out the desulfurization treatment of the waste gas by spraying slurry comprising slurry materials such as lime hydrate and magnesium hydroxide for the waste gas to carry out gas-liquid contact, absorbing sulfur dioxide and the like in the slurry through chemical change with the slurry materials and discharging them out of the system.

The wet type electrostatic precipitator is an apparatus that adds a function of jetting water on the dust-collecting electrode of the dry type electrostatic precipitator with a spray and the like and can always discharge mists and dusts out of the system.

The sulfur compounds contained in the waste gas are mainly sulfur dioxide ($SO_2$), but one portion is changed to sulfur trioxide ($SO_3$) by combustion in a boiler and the catalytic oxidation of the denitration apparatus and further, sulfur trioxide is converted to sulfuric acid if it is reacted with water in the wet desulfurization apparatus. When the concentration of sulfur trioxide is several tens ppm, it is gaseous if temperature is one hundred several tens degree or more but when the gas temperature is the dew point of acid or less (for example, when the concentration of $SO_3$ is 1 to 100 ppm, the dew point of sulfuric acid is 120° C. to 150° C.), it is condensed to be sulfuric acid mist. Since the sulfuric acid mists are corrosive, the temperature of the waste gas is controlled at higher temperature than the dew point of acid, for example, at about 170° C. or more by an air heater and the generation of the sulfuric acid mist is suppressed at a frontal stage of the wet desulfurization apparatus.

By the way, since the wet desulfurization apparatus has the highest desulfurization performance nearby the dew point of water, a large quantity of circulation water is sprayed in the apparatus. Accordingly, in the wet desulfurization apparatus, the temperature of the waste gas is abruptly lowered from about 170° C. to about 50° C. to 60° C. being the dew point of water. At this time, sulfuric acid in the waste gas is converted to mists at the lowering of temperature in the wet desulfurization apparatus. Since the particle diameters of the sulfuric acid mists by such abrupt cooling are small, collision probability with the sprayed slurry is low and it is difficult to remove it in the wet desulfurization apparatus. In this case, the sulfuric acid mists flow to the wet type electrostatic precipitator at a posterior stage. Further, when the waste gas is abruptly cooled, mists with a small particle diameter are generated, but since the finer the particles are, the higher the vapor pressure of particle surface is, coagulation effect using this as coagulation nuclei is not obtained and the diameters of mists cannot be enlarged.

On the other hand, the particle diameters of mists being collection objectives affect greatly collection performance in the wet type electrostatic precipitator and when the particle diameters are small, migration speed is little; therefore collection efficiency is greatly lowered. In this case, it is necessary to increase electric charge time for the sulfuric acid mists with small particle diameters in order to collect the sulfuric acid mists that passed the wet desulfurization apparatus, and consequently, the apparatus capacity of the wet type electrostatic precipitator must be enlarged; therefore the apparatus is jumboized. In particular, when the particle diameters of the sulfuric acid mists are submicron order with 1 μm or less, it is difficult to charge and there is fear that the sulfuric acid mists pass the wet type electrostatic precipitator and are discharged out of the system. Consequently, it is necessary to enlarge the particle diameters of the sulfuric acid mists to micron order in order not to discharge the sulfuric acid mists out of the system without loading the wet type electrostatic precipitator.

As means for solving the problem, Japanese Unexamined Patent Publication No. 2002-45643 discloses a method of spraying liquid such as water to waste gas introduced into the wet desulfurization apparatus, cooling the temperature of the waste gas to 120° C. to 150° C. and keeping the cooling temperature for 0.5 sec or more. According to the method, the average particle diameter of the sulfuric acid mists in the waste gas introduced into the wet desulfurization apparatus can be enlarged to micron order. Consequently, the average particle diameter of the sulfuric acid mists in the waste gas passing the wet desulfurization apparatus is also micron order and the collection performance of the sulfuric acid mists in the wet type electrostatic precipitator at a posterior stage can be enhanced.

However, the spraying of spray water for cooling the waste gas of Japanese Unexamined Patent Publication No. 2002-45643 is not easy in the adjustment of the particle diameters of sprayed water and water quantity for enlarging the particle diameters of the sulfuric acid mists. Further, the patent document 1 has a problem that a cooling means of spraying liquid for lowering the temperature of the waste gas must be provided between the dry type electrostatic precipitator and the wet desulfurization apparatus and facility cost is high.

Further, the stack gas desulfurization method of Japanese Unexamined Patent Publication No. 10-230128 is a method of condensing water vapor using fine dusts as nuclei, generating mists and improving the collection efficiency of the fine dusts, but the adjustment of the particle diameters of spraying water and water quantity is difficult in like manner as Japanese Unexamined Patent Publication No. 2002-45643 and the particle diameters of the sulfuric acid mists are not considered at all.

DETAILED DESCRIPTION OF THE INVENTION

Summary of the Invention

Then, the purpose of the present invention has been carried out considering these circumstances and is to provide a method for enlarging the particle diameters of sulfuric acid mists in waste gas and collecting the sulfuric acid mists in high efficiency.

The disposal process of waste gas including sulfur oxides related to the present invention is a process for disposing waste gas containing sulfur oxides that introduces the waste gas in dry type electrostatic precipitator to remove dusts and then introduces the waste gas in a wet desulfurization apparatus to carry out desulfurization, wherein outside air with a flow rate at which the waste gas introduced in the wet desulfurization apparatus is the dew point of acid is taken in from an introducing tube to mix the outside air in the waste gas.

Further, the disposal process of waste gas including sulfur oxides related to the present invention is a process for disposing waste gas containing sulfur oxides that introduces the waste gas in dry type electrostatic precipitator to remove dusts and then introduces the waste gas in a wet desulfurization apparatus to carry out desulfurization, wherein one portion of the waste gas is arborized, outside air with a flow rate at which the arborized waste gas is the dew point of acid is introduced in a branch tube, the arborized waste gas and the outside air are mixed and mix gas obtained by the mixing is discharged from the branch tube to be mixed with the waste gas introduced in the wet desulfurization apparatus.

Further, the process of disposing waste gas containing sulfur oxides related to the present invention is characterized in that the temperature of the waste gas flowing the smoke channel is measured and the feed quantity of the outside air from the introducing tube or the branch tube is controlled based on the measured temperature until the temperature of the waste gas in the smoke channel is the dew point of acid.

On the other hand, the disposal apparatus of waste gas containing sulfur oxides related to the present invention is an apparatus for disposing waste gas containing sulfur oxides that introduces the waste gas in dry type electrostatic precipitator to remove dusts and then introduces the waste gas in a wet desulfurization apparatus to carry out desulfurization, characterized in having an introducing tube introducing outside air and mixing the outside air with the waste gas introduced in the wet desulfurization apparatus, a sensor measuring the waste gas temperature at the downstream side of the introducing tube and a control portion controlling the waste gas temperature at the dew point of acid by being connected with the introducing tube and the sensor and by adjusting the flow rate of the outside air taken in the introducing tube based on the measured value of the sensor.

Further, the disposal apparatus of waste gas containing sulfur oxides related to the present invention is an apparatus for disposing waste gas containing sulfur oxides that introduces the waste gas in dry type electrostatic precipitator to remove dusts and then introduces the waste gas in a wet desulfurization apparatus to carry out desulfurization, characterized in having a branch tube arborizing one portion of the waste gas, introducing outside air and discharging mix gas obtained by mixing the outside air with the arborized waste gas and mixing it with the waste gas introduced in the wet desulfurization apparatus, a sensor measuring the waste gas temperature in the branch tube and a control portion controlling the waste gas temperature at the dew point of acid by being connected with the branch tube and the sensor and by adjusting the flow rate of the outside air taken in the introducing tube based on the measured value of the sensor.

The present invention cools by air the waste gas introduced in the wet desulfurization apparatus to the dew point of acid in the waste gas disposal apparatus of the coal thermal power station. Specifically, when an introducing tube is provided at the smoke channel at the frontal stage of the wet desulfurization apparatus and outside air in which the waste gas was adjusted at a flow rate being the dew point of acid is introduced in a smoke channel, the waste gas is cooled to the dew point of acid, the temperature is kept for a fixed time and the mist diameters of the sulfuric acid mists can be enlarged by coagulation effect during the interval. Further, cooling temperature is kept at the dew point of acid of the waste gas for a fixed time by arborizing one portion of the waste gas, introducing the outside air in the branch tube, mixing the outside air with the arborized waste gas and keeping its mix state for a fixed time, to prepare the sulfuric acid mists that are coagulation nuclei, and the mist diameters of the sulfuric acid mists in the waste gas can be enlarged by discharging this in the original waste gas without cooling the original waste gas to the dew point of acid. Thereby, the sulfuric acid mists with large particle diameters can be formed in the waste gas only by air-cooling introducing the outside air in the smoke channel without depending on water spray that is difficult for adjusting the cooling temperature of the waste gas. Consequently, the collection efficiency of the mists in the desulfurization apparatus is improved and the wet type electrostatic precipitator at a posterior stage can be miniaturized. Accordingly, the initial cost and running cost of the wet type electrostatic precipitator are reduced. The mid-stream of piping between the dry type electrostatic precipitator and the wet desulfurization apparatus is opened, the introducing tube or the branch tube is connected and the adjusting valve of the flow rate of the outside air is installed; therefore the air-cooling means of the waste gas can be easily formed. Consequently, it can be easily applied to the existing waste gas disposal apparatus.

DETAILED DESCRIPTION OF THE PREFERRED EMBODIMENTS

Figure 1:
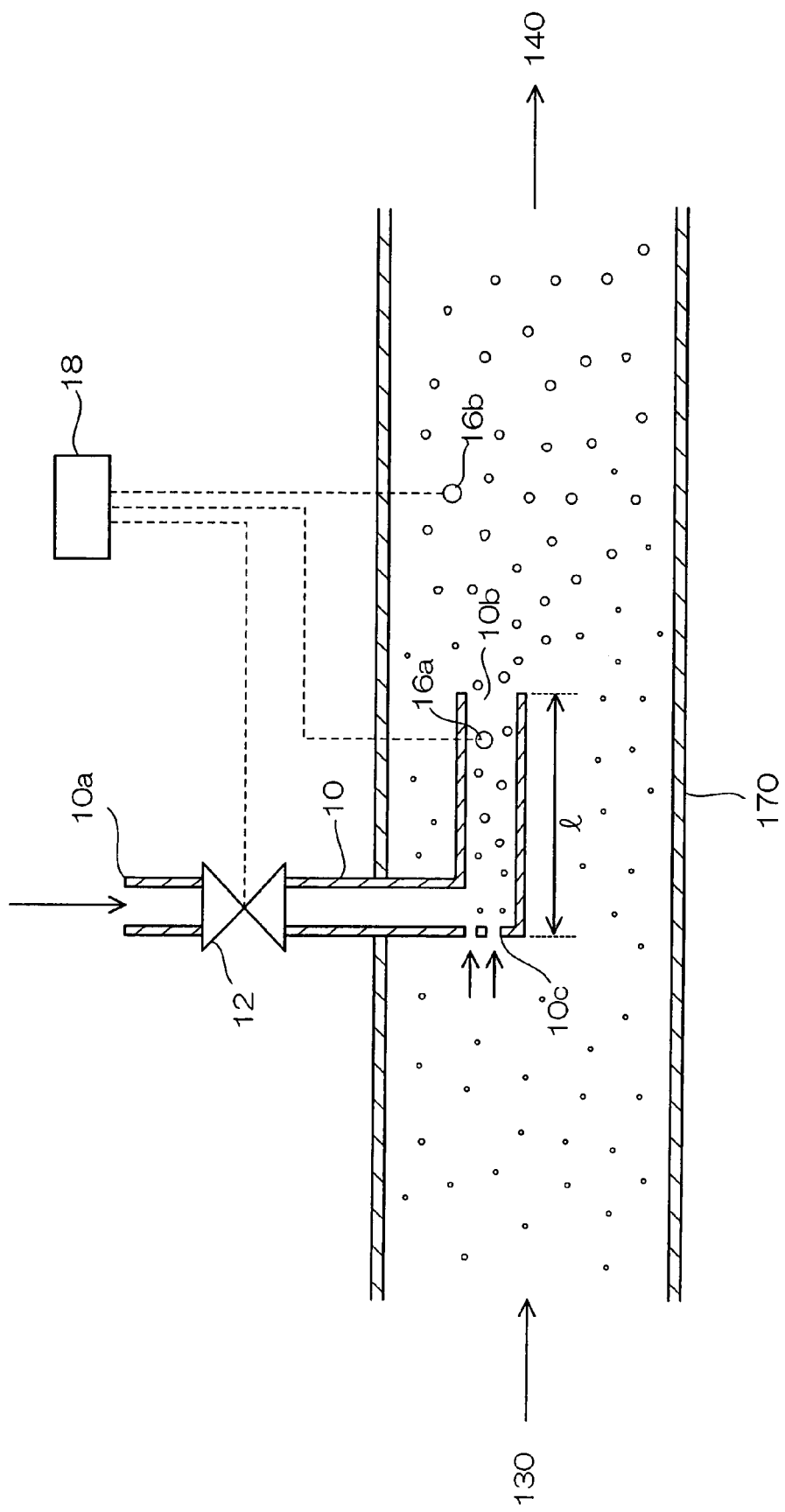
FIG. 1 is the magnified view of the major portion of the process for disposing waste gas containing sulfur oxides related to the first embodiment of the process for disposing waste gas containing sulfur oxides related to the present invention.
Figure 2:
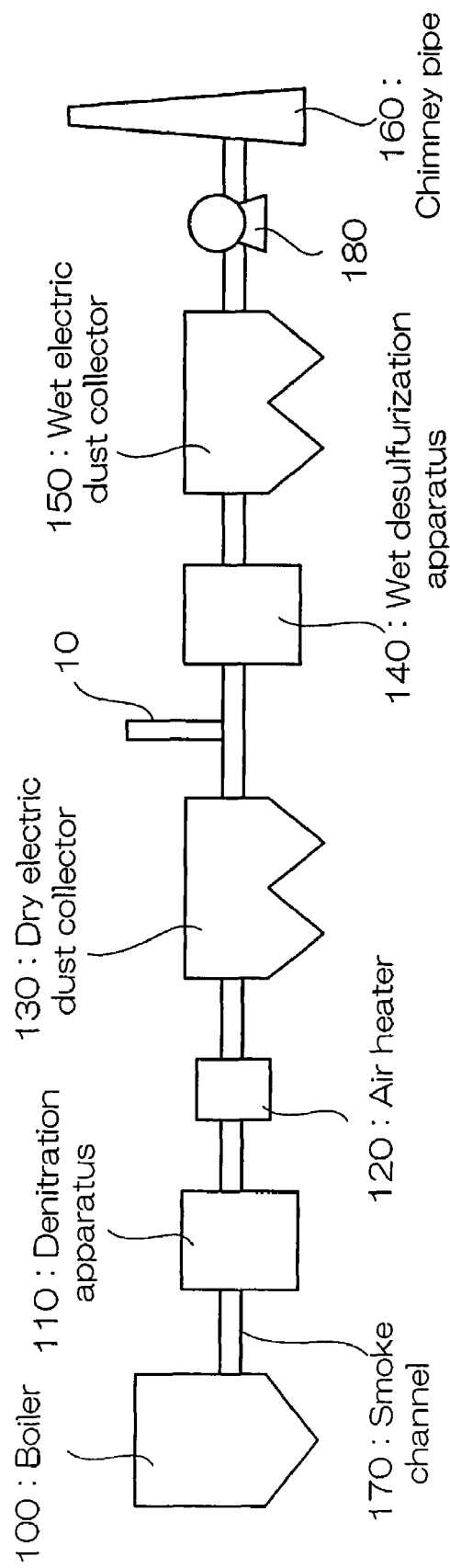
FIG. 2 is the whole flow diagram of the process for disposing waste gas containing sulfur oxides.

The embodiments of the present invention are explained below based on the drawings. FIG. 1 is the illustration view of the major portion of the process for disposing waste gas containing sulfur oxides related to the first embodiment. FIG. 2 is the whole flow diagram of the process for disposing waste gas containing sulfur oxides. Firstly, as shown in FIG. 2, the disposal apparatus of waste gas is connected with a boiler 100, a denitration apparatus 110, an air heater 120, dry type electrostatic precipitator 130, a wet desulfurization apparatus 140, wet type electrostatic precipitator 150, a suction blower 180 and a chimney pipe 160 in order in series by a smoke channel 170. After the suction blower 180 sucked the waste gas of the smoke channel 170 from the boiler 100 to the wet type electrostatic precipitator 150, it discharges the waste gas from the chimney pipe 160 to atmospheric air. Further, a branch tube 10 that arborizes one portion of the waste gas, mixes outside air with the arborized waste gas and then, discharges the mix gas obtained by the mixing to be introduced in the wet desulfurization apparatus 140 is connected with the smoke channel 170 connecting the dry type electrostatic precipitator 130 with the wet desulfurization apparatus 140. Hereat, the upstream side of the smoke channel 170 shows a side at which the boiler 100 is connected and the downstream side of the smoke channel 170 shows a side at which the chimney pipe 160 is connected, respectively.

The whole disposal flow of the waste gas containing sulfur oxides is explained. The waste gas discharged from the boiler 100 of a heat power station contains nitrogen oxides, sulfur oxides, dusts and the like. Then, the waste gas is introduced from the boiler 100 to the denitration apparatus 110. After ammonia is sprayed to the waste gas containing nitrogen oxides in the denitration apparatus 110, it is passed through a catalyst layer. The nitrogen oxides are decomposed to nitrogen and water by action with the catalyst. The temperature of the waste gas passing the denitration apparatus 110 is controlled by the air heater 120 at temperature higher than the dew point of acid at which sulfuric acid mists are not generated. Then, the waste gas passing the air heater 120 is introduced to the dry type electrostatic precipitator 130 to remove dusts in the waste gas. Then, the waste gas from which dusts were removed carries out the control of temperature in the smoke channel to which the branch tube 10 related to the present invention is connected. The waste gas in which the control of temperature was carried out is introduced in the wet desulfurization apparatus 140 and absorbs mainly sulfur dioxide in the waste gas to remove it by spraying a slurry of lime, magnesium hydroxide and the like. Then, the waste gas desulfurized is introduced in the wet type electrostatic precipitator 150, mists are removed and then, the waste gas is discharged from the chimney pipe 160 to atmospheric air.

Then, the branch tube 10 related to the present invention is provided in the smoke channel 170 linking between the outlet of the dry type electrostatic precipitator 130 and the inlet of the wet desulfurization apparatus 140, as shown in FIG. 1. The branch tube 10 is a piping with a less diameter than the smoke channel 170, opening at one end is set as an introduction inlet 10a arborizing outside air and opening at another end is set as a discharge orifice 10b discharging the outside air from the outside air introduction inlet 10a to the smoke channel 170. Further, as shown in FIG. 1, the branch tube 10 is composed of the outside air introduction inlet 10a and the outside air discharge orifice 10b and the intermediate of the tube channel between them are bent by 90 degree. The outside air introduction inlet 10a at one end of the branch tube 10 is protruded from opening formed in one portion of the smoke channel 170. Then, the outside air discharge orifice 10b at another end of the branch tube 10 is arranged to the downstream side of the smoke channel 170. On the other hand, a waste gas take-in orifice 10c introducing one portion of the discharge gas in the branch tube is formed at the upstream side of the smoke channel 170 facing the outside air discharge orifice 10b. Further, an opening and closing valve 12 is provided at the outside air introduction inlet 10a of the branch tube 10. Further, the opening and closing valve 12 is a valve capable of opening and closing the branch tube 10 to a sectional direction and can arbitrarily adjust the introduction quantity (take-in quantity) of outside air from the outside air introduction inlet 10a. A material same as the smoke channel 170 can be used for the branch tube 10, as an example. Further, the piping channel between the waste gas take-in orifice 10c and the outside air discharge orifice 10b keeps the mix state of the waste gas taken in from the waste gas take-in orifice 10c with outside air for a fixed time and is set as an arbitrary length l described later. Further, the sectional shape of the tube can be arbitrarily set and changed so far as the branch tube 10 can take in the outside air into the smoke channel.

The first temperature sensor 16a is installed at the smoke channel 170. The sensor portion of the first temperature sensor 16a is installed in the branch tube 10 and the temperature of the waste gas passing in the branch tube 10 can be measured. The first temperature sensor 16a and the opening and closing valve 12 are connected with a control portion 18. The control portion 18 adjusts the opening and closing of the opening and closing valve 12 based on the measurement value of the first temperature sensor 16a and controls the introduction quantity of outside air.

Then, the process for disposing waste gas containing sulfur oxides by the above-mentioned composition is explained. The waste gas containing sulfur oxides is introduced from the boiler 100 to the denitration apparatus 110 and the nitrogen oxides are removed. Then, $SO_3$ in the waste gas is condensed by the air heater 120 and the waste gas is controlled at temperature higher than the dew point of acid (120° C. to 150° C.) at which sulfuric acid mists are not generated, for example, 170° C. and introduced into the dry type electrostatic precipitator 130. Dusts contained in the waste gas are removed at the dry type electrostatic precipitator 130. The waste gas passing dust removal treatment by the dry type electrostatic precipitator 130 is introduced in the smoke channel 170 between the dry type electrostatic precipitator 130 and the wet desulfurization apparatus 140. Then, the opening and closing valve 12 provided in the branch tube 10 is released and the temperature of the waste gas mixed with outside air introduced in the branch tube is measured by the first temperature sensor 16a provided in the introducing tube 10. The control portion 18 controls the introduction quantity of outside air in the smoke channel based on the measurement value of the first temperature sensor 16a by the opening and closing valve 12 provided in the branch tube 10 so that the temperature of the waste gas mixed with outside air is the dew point of acid. At this time, one portion of the waste gas arborized at the waste gas take-in orifice 10c of the branch tube 10 and taken in the branch tube 10 is mixed with outside air introduced from the outside air introduction inlet 10a of the branch tube 10 that was adjusted at a flow rate at which the portion of the waste gas can be cooled to the dew point of acid, and the temperature of the waste gas is cooled from 170° C. to the dew point of acid. Then, the sulfuric acid mists are formed from gaseous $SO_3$ in the waste gas that was taken in from the waste gas take-in orifice 10c between the waste gas take-in orifice 10c of the branch tube 10 to the waste gas discharge orifice 10b. Further, since the dew point of acid is kept for a fixed time, the sulfuric acid mists enlarge their particle diameters. The sulfuric acid mists mixed with the original waste gas that were discharged from the outside air discharge orifice 10b of the branch tube 10 to the smoke channel 170 and mixed with original waste gas condense other $SO_3$ in the smoke channel 170 not passing the branch tube 10 while being dispersed to a downstream side and sulfuric acid mists in which particle diameters are further enlarged in chain reaction are formed. Further, the cooling time at the dew point of acid of the sulfuric acid mists related to Embodiment can be set as disclosed in Japanese Unexamined Patent Publication No. 2002-45643. Namely, the cooling time may be 0.5 sec for enlarging an average particle diameter to 1.7 μm to 2.0 μm within a range of the dew point of acid of 120° C. to 150° C. Consequently, the length l between the waste gas discharge orifice 10b and the waste gas take-in orifice 10c had better to be designed in order to be able to secure the cooling time of 0.5 sec or more so that the particle diameters of the sulfuric acid mists cooled to the dew point of acid in the waste gas are enlarged, considering the negative pressure of the smoke channel and the like.

The sulfuric acid mists enlarging particle diameters by condensation of $SO_3$ are introduced to the wet desulfurization apparatus 140, and slurry such as lime hydrate and magnesium hydroxide are sprayed to be lowered to nearby the dew point of water. $SO_3$ and the sulfuric acid mists are removed in the wet desulfurization apparatus 140. The desulfurized waste gas is introduced in the wet type electrostatic precipitator 150.

Figure 5:
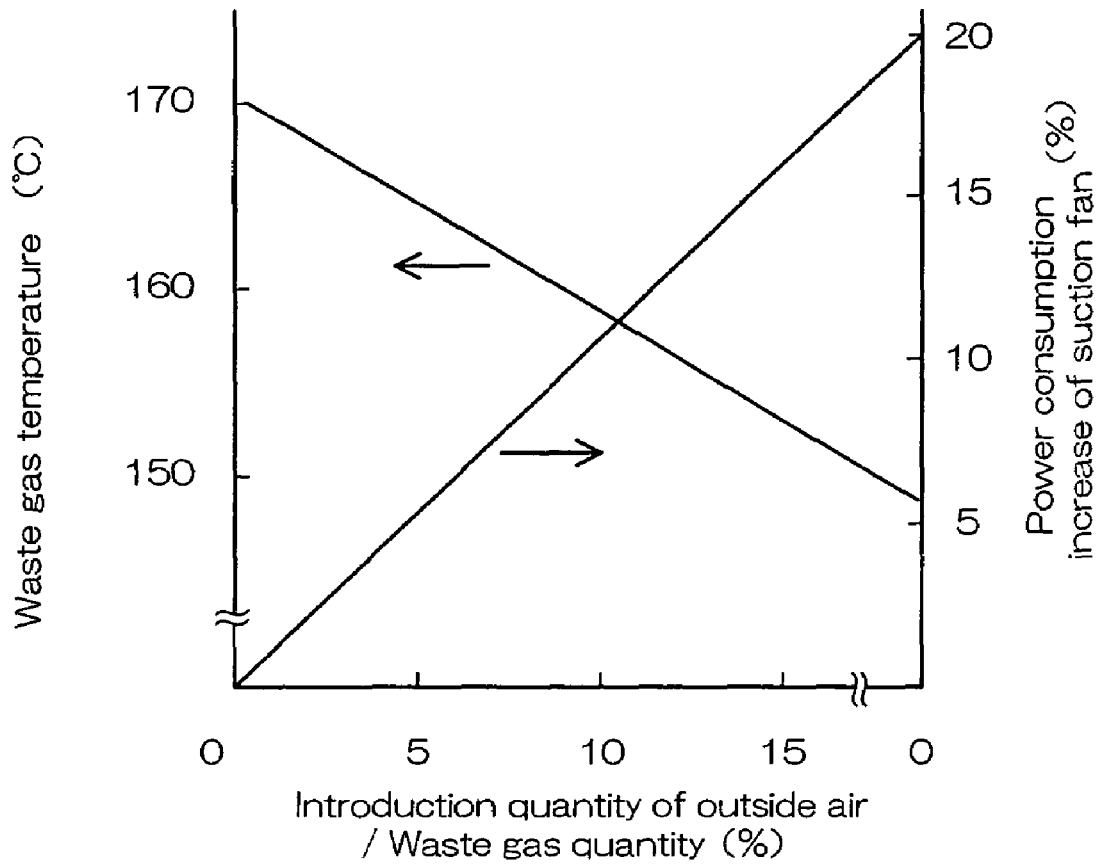
FIG. 5 is a diagram showing relation between the feed quantity of outside air from a branch tube, waste gas temperature and the increase of electric power consumed of a suction blower.

FIG. 5 shows relation between the introduction quantity of outside air from the branch tube, the temperature of the waste gas and the power consumption increase of the suction blower. The horizontal axis of the drawing shows the introduction quantity of outside air/waste gas quantity (%) and a longitudinal axis shows the temperature (° C.) of the waste gas and the power consumption increase of the suction blower (%) respectively. As shown in the drawing, the temperature of the waste gas is lowered in accordance with the increase of the introduction quantity of outside air/waste gas quantity. On the other hand, the power consumption increase of the suction blower tends to increase. Thus, the lowering of the temperature of the waste gas is dependent on the introduction quantity of outside air/waste gas quantity and the increase of the introduction quantity of outside air is dependent on the power consumption of the suction blower. Accordingly, it is practically 3% of the total flow rate of the waste gas. This considers the suction capacity of the suction blower provided between the wet type electrostatic precipitator and a chimney pipe. Namely, the range of fixed suction capacity is defined for an existing suction blower. Accordingly, it considers that excessive load is not applied to suction blower by the introduction of outside air of the branch tube, exceeding the range of suction capacity.

In the present Embodiment, although the waste gas is arborized in the inside of the smoke channel, it may be carried out at the outside of the smoke channel. Namely, an alternate channel in which one portion of the waste gas detours is provided, this is set as the branch tube of the waste gas, an introduction orifice introducing outside air is provided at the branch tube, the upstream side of the branch tube is connected with the smoke channel at the posterior stage of the wet type electrostatic precipitator, and the downstream side of the branch tube is connected with the smoke channel at the position of the smoke channel capable of converging with the waste gas introduced in the wet desulfurization apparatus.

Further, although a process of introducing outside air from the branch tube to cool one portion of the waste gas was explained in the above-mentioned Embodiment, it may be constituted that as shown in FIG. 1, the second temperature sensor 16b is installed in the smoke channel 170 to be connected with the control portion 18. Namely, the temperature of the waste gas at the smoke channel 170 is measured by the second temperature sensor 16b, the opening and closing quantity of the opening and closing valve 12 is adjusted based on the measurement value to introduce outside air from the branch tube 10, the outside air is mixed with the waste gas, the whole of the waste gas flowing in the smoke channel 170 is cooled and the temperature of the waste gas is kept at the dew point of acid for a fixed time. Thus, $SO_3$ in the whole waste gas in the smoke channel is converted from gaseous $SO_3$ to sulfuric acid mists, and this condenses other gaseous $SO_3$ while being diffused at downstream side to form the sulfuric acid mists. The sulfuric acid mists whose particle diameters are enlarged by the condensation can be desulfurized in the wet desulfurization apparatus and the wet type electrostatic precipitator of the smoke channel in like manner as the above description. Further, in this case, the branch tube 10 functions as an introduction tube introducing outside air-cooling the whole waste gas.

Thus, since the sulfuric acid mists having larger particle diameters are removed at the wet desulfurization apparatus 140 at a frontal stage, the wet type electrostatic precipitator 150 related to the present Embodiment can lessen the volume of the apparatus and can reduce initial cost and running cost. Further, outside air can be easily taken in the smoke channel from the branch tube utilizing that the inside of the smoke channel is negative pressure and the waste gas can be cooled. At this time, the opening and closing valve 12 is connected with the halfway of the branch tube 10 and the flow-in quantity of outside air can be arbitrarily adjusted; therefore the temperature of the waste gas can be easily carried out.

Further, the control of the temperature of the dew point of water of the waste gas at the smoke channel may be carried out by visually confirming the measurement value of the temperature sensor 16 and manually adjusting the opening and closing quantity of the opening and closing valve 12 of the branch tube 10.

Figure 3:
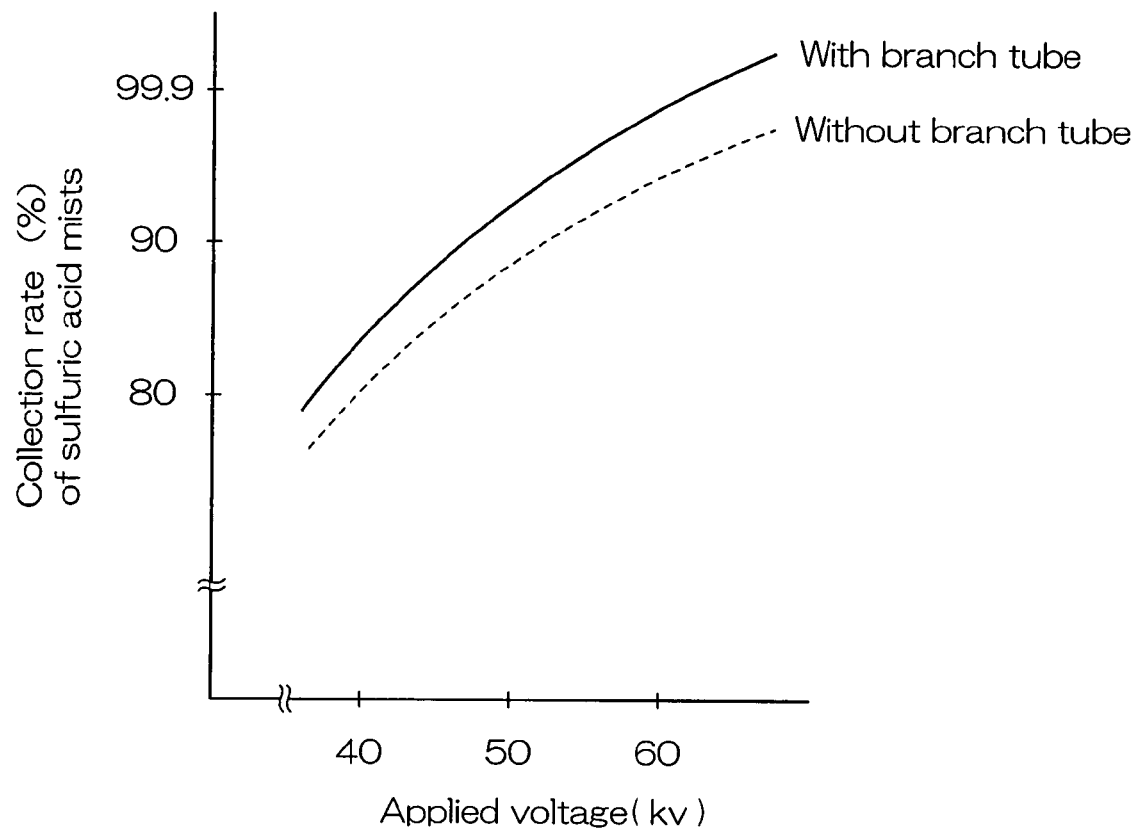
FIG. 3 is a diagram showing the collection rate of sulfuric acid mists in wet type electrostatic precipitator.

FIG. 3 is a diagram showing the collection rate of sulfuric acid mists in wet type electrostatic precipitator. The longitudinal axis in the drawing shows the collection rate (%) of sulfuric acid mists and the horizontal axis shows applied voltage (kv) respectively. Further, a solid line in the drawing is a disposal apparatus in which an introduction tube was provided at the smoke channel between the dry type electrostatic precipitator and the desulfurization apparatus and a dotted line shows a disposal apparatus in which an introduction tube is not provided at the smoke channel. As illustrated, when the introduction tube is provided at the smoke channel, the collection rate at an applied voltage of 40 to 60 kv is respectively raised in comparison with a case of not providing the introduction tube. Thus, it is grasped that the particle diameters of the sulfuric acid mists in the smoke channel between the dry type electrostatic precipitator and the wet desulfurization apparatus are enlarged by introduction of outside air and the collection rate of the sulfuric acid mists in the wet type electrostatic precipitator at the downstream side of the smoke channel is improved.

Figure 4:
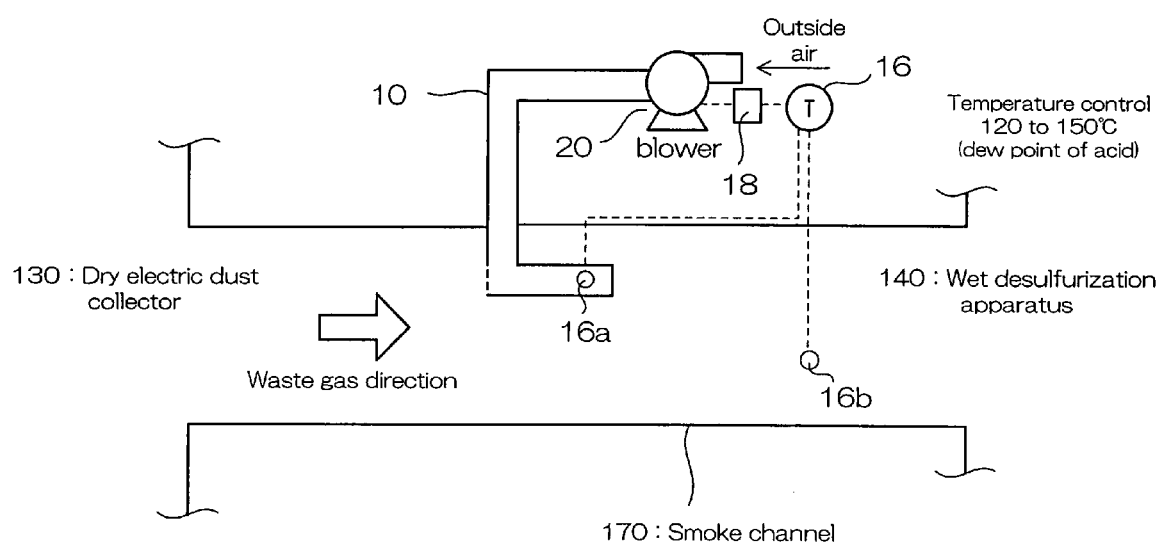
FIG. 4 is an illustration diagram of the variation example of the first embodiment.

Then, the variation example of the process for disposing waste gas of the first Embodiment is explained. FIG. 4 is an explanation diagram of the variation example of the process for disposing waste gas of the present invention. Further, the same composition as FIG. 1 exhibits same action and the same codes are provided. Constitutional difference between the process for disposing waste gas shown in FIG. 1 and the variation example is a point that a blower 20 being means for feeding outside air is provided at the opening portion at another end of the branch tube 10 of the variation example. The blower 20 can adjust the flow rate of outside air flown in the branch tube 10. The inside of the smoke channel is usually negative pressure because of the suction blower provided at the smoke channel. However, when the negative pressure of the smoke channel is not adequate, the feed quantity of outside air introduced into the smoke channel 170 is arbitrarily adjusted by adjusting the flow rate of the blower 20. At this time, in like manner as Embodiment shown in FIG. 1, the feed quantity of outside air of the blower 20 measures the temperature of the waste gas by the first temperature sensor 16a and the second temperature sensor 16b provided in the smoke channel. Further, it is better that the flow rate of the blower 20 is adjusted based on the measurement values of the first temperature sensor 16a and the second temperature sensor 16b by the first temperature sensor 16a, the second temperature sensor 16b and the control portion 18 connected with the blower 20. Further, in the variation example of the process for disposing waste gas, the opening and closing valve 12 is provided in the branch tube 10 in like manner as FIG. 1 and the opening and closing may be carried out in matching with the introduction of outside air by the blower.

The invention claimed is:

1. A process for disposing waste gas containing sulfur oxides comprising
   introducing the waste gas into a dry type electrostatic precipitator to remove dust;
   introducing outside air to mix the outside air with the waste gas in a smoke channel; and then
   introducing the waste gas mixed with outside air into a wet desulfurization apparatus to carry out desulfurization,
   wherein the outside air is introduced with a flow rate at which the temperature of the waste gas mixed with outside air is at the dew point of acid.

2. A process for disposing waste gas containing sulfur oxides comprising
   introducing the waste gas into a dry type electrostatic precipitator to remove dust;
   arborizing a portion of the waste gas into a branch tube;
   introducing outside air into the branch tube to mix with the arborized waste gas, the outside air being introduced at a flow rate at which the temperature of the arborized waste gas mixed with outside air in the branch tube is at the dew point of acid;
   discharging the arborized waste gas mixed with outside air from the branch tube to be mixed with the waste gas in a smoke channel;
   and then introducing the waste gas into a wet desulfurization apparatus to carry out desulfurization.

3. The process for disposing the waste gas containing the sulfur oxides according to claim 1, wherein the temperature of the waste gas flowing in the smoke channel is measured and a feed quantity of the outside air is controlled based on the measured temperature until the temperature of the waste gas in the smoke channel is at the dew point of acid.

4. The process for disposing the waste gas containing the sulfur oxides according to claim 2, wherein the temperature of the waste gas flowing in the smoke channel is measured and a feed quantity of the outside air from the branch tube is controlled based on the measured temperature until the temperature of the waste gas in the smoke channel is at the dew point of acid.

5. An apparatus for disposing waste gas containing sulfur oxides that introduces the waste gas in a dry type electrostatic precipitator to remove dust and then introduces the waste gas into a wet desulfurization apparatus to carry out desulfurization, characterized in having an introducing tube introducing outside air and mixing the outside air with the waste gas introduced in the wet desulfurization apparatus, a sensor measuring the waste gas temperature at the downstream side of the introducing tube and a control portion controlling the waste gas temperature at the dew point of acid, the control portion being connected with the introducing tube and the sensor, by adjusting the flow rate of the outside air taken in the introducing tube based on the measured value of the sensor.

6. An apparatus for disposing waste gas containing sulfur oxides that introduces the waste gas into a dry type electrostatic precipitator to remove dust and then introduces the waste gas into a wet desulfurization apparatus to carry out desulfurization, characterized in having a branch tube arborizing a portion of the waste gas, introducing outside air and discharging a mixed gas obtained by mixing the outside air with the arborized waste gas and mixing it with the waste gas introduced in the wet desulfurization apparatus, a sensor measuring the waste gas temperature in the branch tube and a control portion controlling the waste gas temperature at the dew point of acid, the control portion being connected with the introducing tube and the sensor, by adjusting the flow rate of the outside air taken in the introducing tube based on the measured value of the sensor.

* * * * *